US008494772B2

(12) United States Patent
Casey et al.

(10) Patent No.: US 8,494,772 B2
(45) Date of Patent: Jul. 23, 2013

(54) METHOD FOR CALCULATING HYDROGEN STORAGE INVENTORY

(75) Inventors: Daniel G. Casey, Kingwood, TX (US); Brandon W. Janak, Katy, TX (US); Paul D. Burger, Houston, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 11/749,838

(22) Filed: May 17, 2007

(65) Prior Publication Data

US 2008/0288208 A1 Nov. 20, 2008

(51) Int. Cl.
*G01F 22/02* (2006.01)
*G06Q 10/08* (2012.01)
*G06F 17/40* (2006.01)
*G06F 19/00* (2011.01)

(52) U.S. Cl.
USPC ............. 702/1; 73/149; 340/605; 702/127; 705/28; 708/200

(58) Field of Classification Search
USPC ............. 702/23, 1, 22, 31, 32, 33, 50, 55, 702/127, 130, 136, 137, 138, 140, 155, 156, 702/182, 183, 184, 187, 188, 189; 73/32 R, 73/149, 290 R, 432.1, 865.8; 340/500, 540, 340/603, 605, 870.01, 870.07; 705/1.1, 16, 705/22, 28; 708/100, 105, 200
IPC ........ F17C 1/00,13/00, 13/02, 13/023, 13/025, F17C 13/026, 13/028; G01B 21/00, 21/28; G01F 17/00, 22/00, 22/02; G01N 7/00, 9/00, G01N 9/36; G06F 11/00, 11/30, 11/32, 17/00, G06F 17/40, 19/00; G06Q 10/00, 10/08, G06Q 10/087, 2010/00, 2010/0063; Y02E 60/00, 60/30, 60/32, 60/321
See application file for complete search history.

(56) References Cited

U.S. PATENT DOCUMENTS

| | | | |
|---|---|---|---|
| 5,244,146 A * | 9/1993 | Jefferson et al. | 236/11 |
| 6,786,245 B1 * | 9/2004 | Eichelberger et al. | 141/4 |
| 6,810,925 B2 | 11/2004 | Graham et al. | |
| 7,059,364 B2 | 6/2006 | Kountz et al. | |
| 7,209,865 B2 * | 4/2007 | Scott et al. | 702/188 |
| 7,647,194 B1 * | 1/2010 | Casey et al. | 702/130 |
| 7,690,208 B2 * | 4/2010 | Immel | 62/48.1 |
| 2004/0163731 A1 * | 8/2004 | Eichelberger et al. | 141/284 |
| 2006/0142974 A1 * | 6/2006 | Scott et al. | 702/188 |
| 2007/0029330 A1 * | 2/2007 | Immel | 220/565 |

OTHER PUBLICATIONS

NIST Tool: "Thermophysical Properties of Hydrogen". NIST 1991, 1994, 1996, 1997, 1998, 1999, 2000, 2001, 2003, 2005 copyright by the U.S. Secretary of Commerce on behalf of the United States of America. http://webbook.nist.gov/cgi/fluid.cgi?ID=C13337408&Action=Page%20.*

Lemmon, Eric W., Marcia L. Huber, and Daniel G. Friend, *2006-01-0434 Standardized Equation for Hydrogen Gas Densities for Fuel Consumption Applications*, National Institute of Standards and Technology, Boulder, Colorado.

* cited by examiner

*Primary Examiner* — Edward Cosimano
(74) *Attorney, Agent, or Firm* — Melissa Patangia; Tiffany E. Weksberg

(57) ABSTRACT

Methods for accurately and conveniently calculating the inventory of hydrogen storage in a stationary storage vessel using the external ambient temperature and the internal pressure are disclosed in the present invention. To account for the delay in the heat transfer from the ambient air to the storage vessel and then to the hydrogen gas a first order filter can be used on the external ambient temperature. Following the application of the first order filter on the external ambient temperature, an empirical equation is used to calculate the mass of hydrogen in the stationary storage vessel.

20 Claims, 6 Drawing Sheets

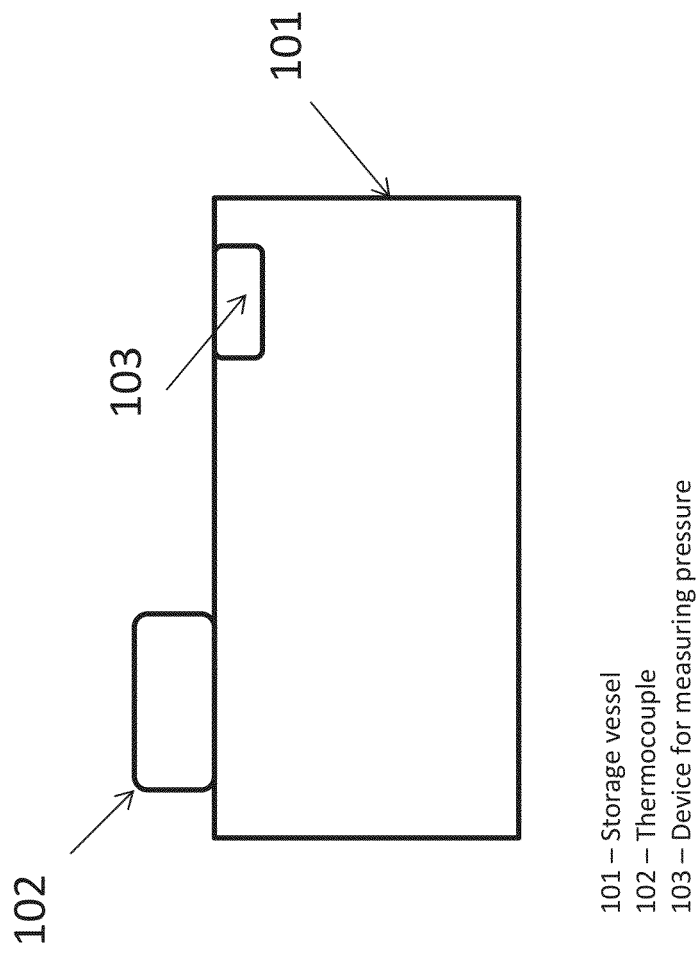

METHOD FOR CALCULATING HYDROGEN STORAGE INVENTORY

FIELD OF THE INVENTION

The present invention relates to methods for calculating the amount of gaseous hydrogen contained in a stationary storage vessel.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluents gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide widespread generation, storage and distribution.

One way to overcome this difficulty is through the operation of hydrogen energy stations. At hydrogen energy stations, reformers are used to convert hydrocarbons to a hydrogen rich gas stream. The hydrogen rich gas stream can be purified to a high purity product. The gaseous hydrogen is then stored in stationary storage vessels at the hydrogen energy stations to provide inventory to fuel hydrogen vehicles. The stationary storage vessels may be constructed of steel or a composite material. Station operators must be able to calculate the amount of gaseous hydrogen stored at the hydrogen energy stations. In addition to other considerations, an accurate hydrogen storage calculation is necessary for leak checking on the storage vessels.

The inventory of gaseous hydrogen in a stationary storage vessel is commonly determined using the external ambient temperature and the internal pressure to calculate the mass of hydrogen in the stationary storage vessel. To make this calculation, the ideal gas law, PV=nRT, may be used. However, the ideal gas law is not accurate at high pressures. As a result, the inventory of gaseous hydrogen in a stationary storage vessel is commonly determined using an equation of state. One example of an equation of state is the modified Benedict Rubin & Web equation of state:

$$p = \rho RT + \sum_{i=1}^{19} G(i)\rho^{n_i} T^{m_i} + \sum_{i=20}^{32} G(i)\rho^{n_i} T^{m_i} \exp[\gamma \rho^2]$$

(*Standardized Equation for Hydrogen Gas Densities for Fuel Consumption Application* by Eric W. Lemmon, Marcia L. Huber, and Daniel G. G. Friend of the National Institute of Standards and Technology.) However, this equation of state is inconvenient to use as it not only consists of 32 terms but also requires iterative calculations for the solution.

In the calculation, the external ambient temperature is used in lieu of the internal storage vessel temperature to eliminate the need to penetrate the high pressure storage vessel. In addition, the use of external ambient temperature also eliminates the need to install electrical equipment in the Class 1 Division 2 Group B area (as defined by OSHA regulations) around the storage vessels. While the use of external ambient temperature has advantages, it also results in an inaccurate calculation of the mass of hydrogen in the vessel due to the delay in heat transfer from the ambient temperature to the hydrogen gas within the vessel. This delay is due to the time it takes to transfer heat through the thousands of pounds of steel that make up the stationary hydrogen storage vessels to the kilograms of hydrogen gas inside the tank. Daily temperature swings of approximately 20° C. will affect the pressure in the hydrogen storage vessels. Due to the delay, peak pressure will lag peak ambient temperature as shown in FIG. 1 depicting data from a hydrogen energy station in Orlando, Fla. For example, for 300 kg hydrogen storage systems the variation in inventory can be greater than 2%.

The present invention addresses both of these concerns by providing methods for conveniently and accurately calculating hydrogen storage inventory in a stationary storage vessel.

SUMMARY OF THE INVENTION

In the present invention, methods for calculating the inventory of hydrogen storage using the external ambient temperature and the internal pressure are disclosed. The methods of the present invention are accurate to within 1% of the National Institute of Standards and Technology (NIST) tabulated data, if the pressure and temperature are accurate. In addition, the methods of the present invention are not only accurate but convenient to use.

First, to account for the delay in the heat transfer from the ambient air to the storage vessel and then to the hydrogen gas a first order filter can be used on the external ambient temperature. By adding this filter a more accurate calculation of the hydrogen in storage can be made. The first order filter will improve the accuracy of the calculation of hydrogen storage mass by a factor of ten. Following the application of the first order filter on the external ambient temperature, an empirical equation is used to calculate the mass of hydrogen in the stationary storage vessel.

Having an accurate hydrogen storage mass allows for leak checking of the storage vessel, since small losses in the vessel can be detected. The use of the first order filter would allow the process control program to detect leaks on the order of two liters per minute automatically. Having an accurate hydrogen storage mass also allows for material balances to be calculated on the hydrogen energy station.

BRIEF DESCRIPTION OF THE FIGURES

The description is presented with reference to the accompanying figures in which:

FIG. 1A shows an exemplary steel or composite storage vessel 101 for storing gaseous hydrogen, a thermocouple 102 for measuring an external ambient temperature, and a device for measuring pressure of internal hydrogen 103.

DETAILED DESCRIPTION OF THE INVENTION

Figure 1:
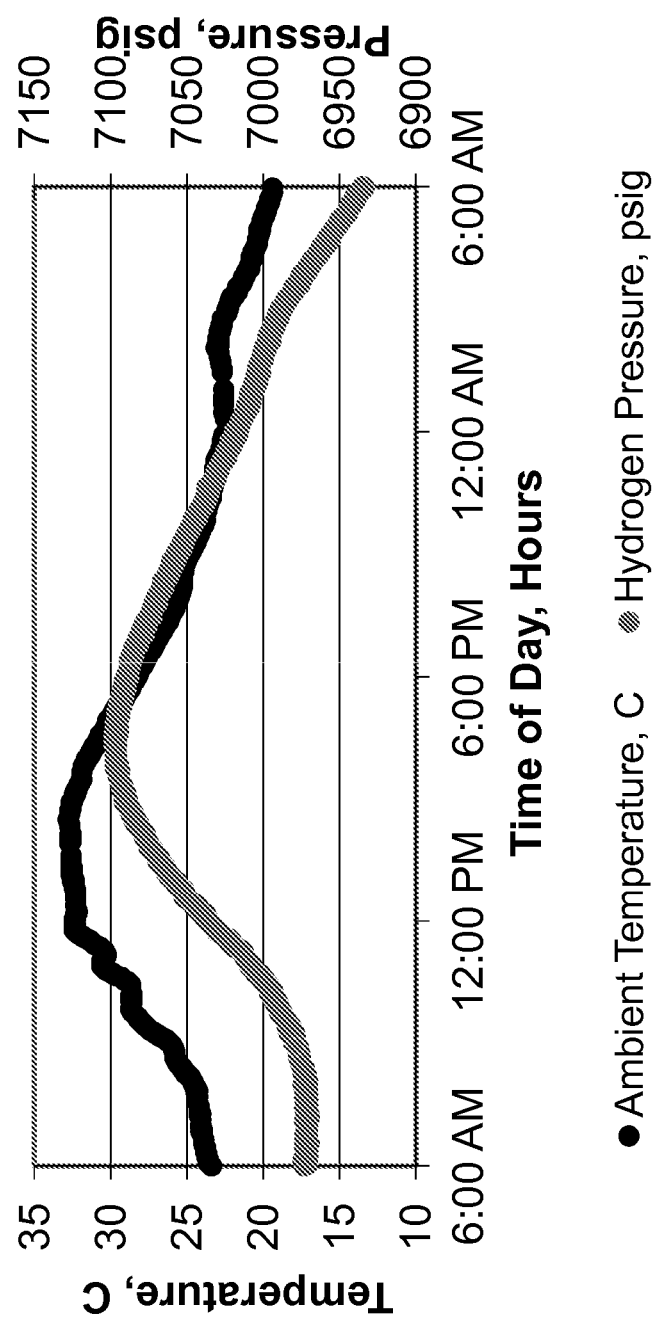
FIG. 1 shows the lag between peak temperature and peak pressure due to the delay in heat transfer. The ambient temperature (° C.) is shown in black and the hydrogen pressure (psig) is shown in grey.

Storing gaseous hydrogen in steel or composite storage vessels is well known in the art. As shown in FIG. 1A, the gaseous hydrogen is stored in steel or composite storage vessels 101. The present invention discloses methods for calculating the inventory of gaseous hydrogen contained in a stationary storage vessel 101 using the external ambient temperature and the internal pressure of the storage vessel 101. The method includes the application of a first order filter on the external ambient temperature and then the computation of the mass of hydrogen using an empirical equation.

First, the method of the present invention comprises measuring the external ambient temperature of the stationary storage vessel (Ti). There are various means known for measuring the external ambient temperature of a storage vessel such as the use of an external thermocouple 102 as shown in FIG. 1A. In one embodiment of the present invention, the scan rate of the measurement of the external ambient temperature is 1 Hz.

Next, the method of the present invention comprises applying a first order filter to the measured external ambient temperature to compute a calculated temperature (Tc). This first order filter accounts for the delay in the heat transfer from the ambient air to the storage vessel and then to the hydrogen gas.

The first order filter includes a time constant. The time constant describes the system. The larger the time constant, the slower the system. In the present invention, the time constant is empirically determined for the stationary storage vessel. Typically time constants are on the order of seconds, but the time constant for the present invention needs to be on the order of hours because the system is so slow. In the present invention, the time constant needs to be 5-8 hours depending on the thickness and material of the storage vessel. Hydrogen storage vessels must be thick to contain the gas pressures inside the tanks. Hydrogen storage vessels are typically constructed of steel or a composite. In an illustrated embodiment of the present invention, the stationary storage vessel is constructed of steel and has a time constant of approximately 7 hours.

The time constant ($\tau$) is used to compute an alpha value ($\alpha$) via the following equation:

$$\tau = 1/\alpha$$

Figure 2:
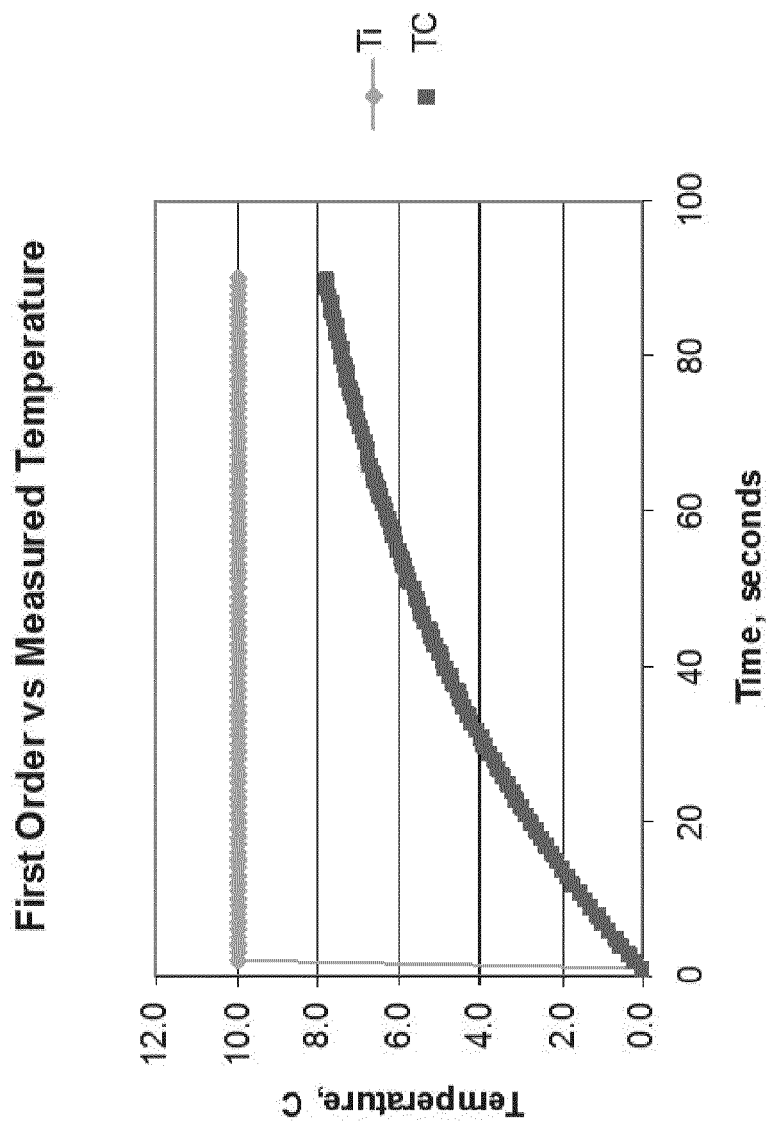
FIG. 2 shows for a one minute time constant and an instantaneous change from 0 to 10° C. (Ti, light grey), the calculated value reaches 6.4° C. in 1 minute (TC, dark grey).

The alpha value is used to calculate a time weighted average of the temperature, the calculated temperature (Tc), by the following temperature equation:

$$Tc = \alpha * Tc' + (1-\alpha)Ti$$

where Tc' is a previous calculated temperature. A large alpha makes the equation heavily weighted on the previous value. The equation is such that a step change reaches 63% of that change in the time constant. For a one minute time constant and an instantaneous change from 0 to 10° C., the calculated value reaches 6.3° C. in 1 minute as shown in FIG. 2.

Following the application of the first order filter on the external ambient temperature, the following empirical equation of the present invention is then used to accurately calculate the density (d) of hydrogen in the stationary storage vessel using the calculated temperature (Tc) and the measured pressure (P):

$$d = \frac{1.7941*(P)}{(Tc+273.15)} - \frac{0.046036*(P)^{1.6}}{(Tc+273.15)^{1.5}}$$

where d is in kg/m³; P is in psig; and T is in ° C. There are various known means for measuring pressure. The method of the present invention can further comprise calculating a mass from the volume of the stationary storage vessel and the calculated density.

The mass of hydrogen in stationary storage vessels is typically calculated via an equation of state. Equations of state are more accurate than the ideal gas law (PV=nRT) which is not accurate at high pressures; however, an even more accurate determination of the density of the hydrogen in the storage vessel can be achieved through the use of the National Institute of Standards and Technology (NIST) tabulated data. The empirical equation of the present invention is accurate to within 1% of the NIST values, if the pressure and temperature are accurate. The empirical equation is based on over 1600 NIST data points. The empirical equation is accurate in the range of 500 to 12,000 psia and -15 to 90° C.

Figure 3:
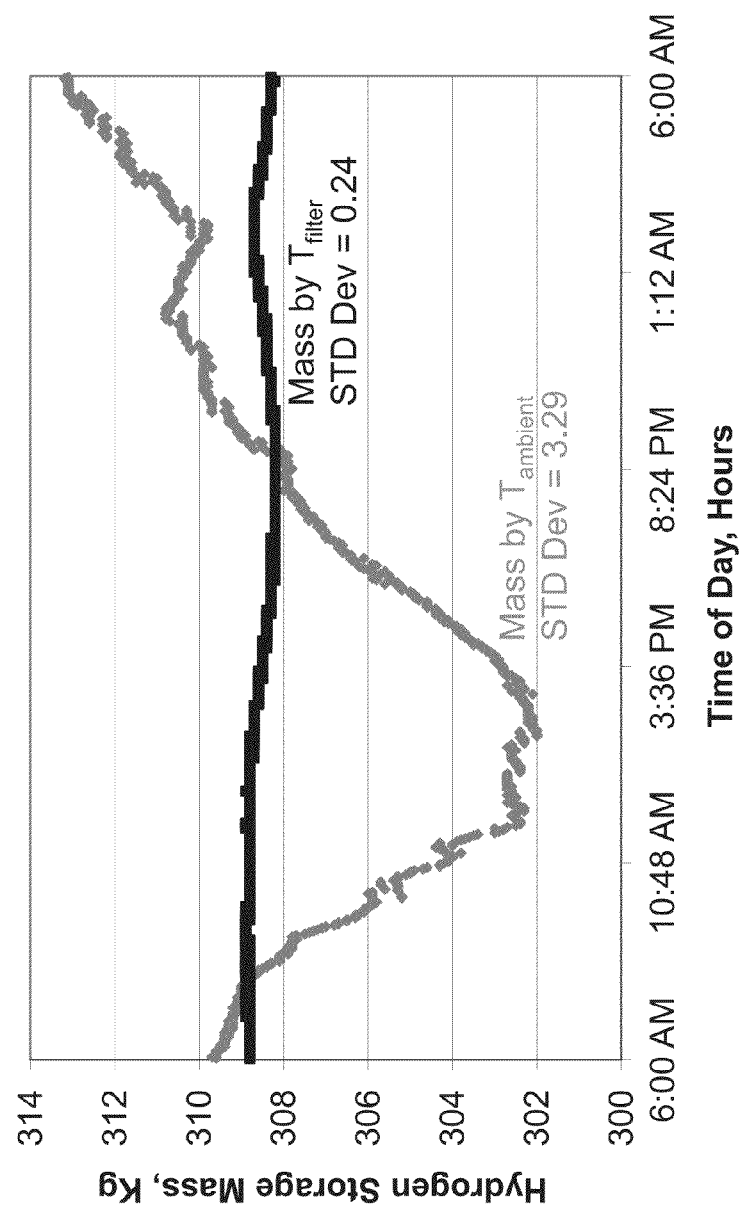
FIG. 3 shows a comparison of a typical calculation of hydrogen storage inventory for a fixed mass of hydrogen to the mass calculated using the first order filter on ambient temperature. The black points represent mass by $T_{filter}$, and the grey points represent mass by $T_{ambient}$.

FIG. 3 shows a comparison of a typical calculation of hydrogen storage inventory for a fixed mass of hydrogen to the mass calculated using the first order filter on ambient temperature. For constant volume storage vessels, pressure will vary inversely with temperature but mass should remain fixed or constant. As the figure demonstrates, the use of the first order filter greatly improves the calculation of constant mass. The data in the figure is from a hydrogen energy station in Orlando, Fla.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

Figure 4:
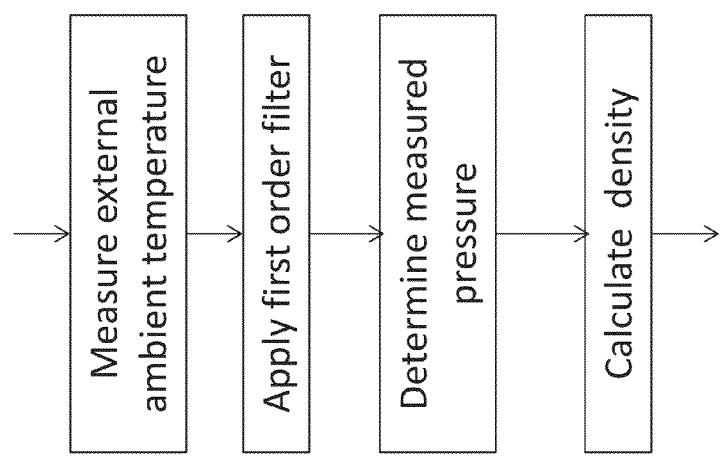
FIG. 4 is a flow chart of an embodiment of the invention.

FIG. 4 illustrates an embodiment of a method for calculating inventory of gaseous hydrogen contained in a stationary storage vessel comprising measuring an external ambient temperature, applying a first order filter, determining measured pressure, and calculating the density.

Figure 5:
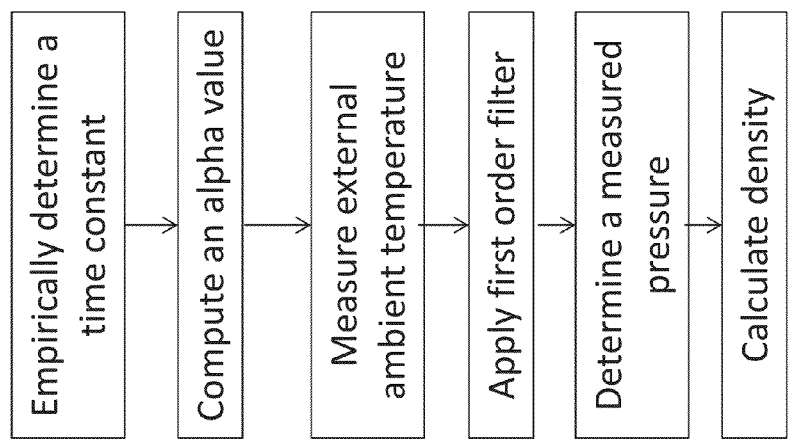
FIG. 5 is a flow chart of another embodiment of the invention.

FIG. 5 illustrates another embodiment of a method for calculating inventory of gaseous hydrogen contained in a stationary storage vessel comprising: empirically determining a time constant, computing an alpha value, measuring external ambient temperature, applying a first order filter, determining a measured pressure and calculating a density.

What is claimed is:

1. A method for calculating density of gaseous hydrogen contained in a stationary storage vessel comprising:

measuring an external ambient temperature of said stationary storage vessel (Ti);

applying a first order filter to said external ambient temperature to compute, by a computer, a calculated temperature (Tc);

determining a measured pressure (P); and calculating, by said computer, a density (d) of said calculated temperature and said measured pressure with an empirical equation $$d = \frac{1.7941*(P)}{(Tc+273.15)} - \frac{0.046036*(P)^{\wedge 1.6}}{(Tc+273.15)^{\wedge 1.5}}$$

where d is in kg/m³; P is in psig; and T is in °C.

2. The method of claim 1 further comprising calculating, by said computer, a mass from volume of said stationary storage vessel and said density.

3. The method of claim 1 wherein said stationary storage vessel is constructed of steel.

4. The method of claim 1 wherein the scan rate of the measurement of the external ambient temperature is 1 Hz.

5. The method of claim 1 wherein said external ambient temperature is between −15 and 90° C.

6. The method of claim 1 wherein said measured pressure is between 500 and 12,000 psia.

7. The method of claim 1 wherein said first order filter includes a time constant (t) wherein said time constant is empirically determined for said stationary storage vessel.

8. The method of claim 7 wherein said time constant is used to compute, by said computer, an alpha value (α) by time constant equation $$t=1/\alpha.$$

9. The method of claim 8 wherein said alpha value is used to compute, by said computer, said calculated temperature by temperature equation $$Tc=\alpha*Tc'+(1-\alpha)Ti$$

where Tc' is a previous calculated temperature.

10. A method for calculating density of gaseous hydrogen contained in a stationary storage vessel comprising:
    empirically determining a time constant (t) for said stationary storage vessel which is constructed of steel or composite material;
    computing, by a computer, an alpha value (α) from said time constant by time constant equation $$t=1/\alpha$$

measuring an external ambient temperature of said stationary storage vessel (Ti) wherein said external temperature is measured using a thermocouple which is external to said stationary storage vessel;
    applying a first order filter to said external ambient temperature to compute, by said computer, a calculated temperature (Tc) by temperature equation $$Tc=\alpha*Tc'+(1-\alpha)Ti$$

where Tc' is a previous calculated temperature;
    determining a measured pressure (P) of internal hydrogen in said stationary storage vessel; and
    calculating, by said computer, a density (d) from said calculated temperature and said measured pressure with an empirical equation $$d = \frac{1.7941*(P)}{(Tc+273.15)} - \frac{0.046036*(P)^{\wedge 1.6}}{(Tc+273.15)^{\wedge 1.5}}$$

where d is in kg/m³; P is in psig; and T is in °C.

11. The method of claim 10 further comprising calculating, by said computer, a mass from volume of said stationary steel storage vessel and said density.

12. The method of claim 10 wherein said stationary storage vessel is constructed of steel.

13. The method of claim 10 wherein the scan rate of the measurement of the external ambient temperature is 1 Hz.

14. The method of claim 10 wherein said external ambient temperature is between −15 and 90° C.

15. The method of claim 10 wherein said measured pressure is between 500 and 12,000 psia.

16. An apparatus for storing and calculating an density of hydrogen comprising:
    (1) a stationary storage vessel constructed of steel or a composite material;
    (2) a thermocouple for measuring an external ambient temperature of said stationary storage vessel (Ti) wherein said thermocouple is external to said stationary storage vessel; and
    (3) a device for measuring pressure (P) of internal hydrogen in said stationary storage vessel;
    wherein the inventory of hydrogen in said storage vessel is calculated by
        measuring an external ambient temperature of said stationary storage vessel (Ti) using said thermocouple;
        applying a first order filter to said external ambient temperature to compute a calculated temperature (Tc);
        measuring pressure (P) using said device for measuring pressure; and
        calculating a density (d) of said calculated temperature and said measured pressure with an empirical equation $$d = \frac{1.7941*(P)}{(Tc+273.15)} - \frac{0.046036*(P)^{\wedge 1.6}}{(Tc+273.15)^{\wedge 1.5}}$$

where d is in kg/m³; P is in psig; and T is in °C.

17. The apparatus of claim 16 wherein said stationary storage vessel is constructed of steel and wherein the scan rate of the measurement of the external ambient temperature is 1 Hz.

18. The apparatus of claim 16 wherein said external ambient temperature is between −15 and 90° C. and said measured pressure is between 500 and 12,000 psia.

19. The apparatus of claim 16 wherein said apparatus further comprises a process control program.

20. The apparatus of claim 19 wherein the process control program detects leaks automatically.

* * * * *